United States Patent
Torres

(10) Patent No.: US 6,499,438 B1
(45) Date of Patent: Dec. 31, 2002

(54) FLY PROTECTOR

(76) Inventor: Pablo R. Torres, Le Pampa 1175, Torre II dto. 2 "d" 1428, Buenos Aires (AR)

(*) Notice: Subject to any disclaimer, the term of this patent is extended or adjusted under 35 U.S.C. 154(b) by 0 days.

(21) Appl. No.: 09/772,178

(22) Filed: Jan. 29, 2001

(51) Int. Cl.[7] .............................. A01K 13/00; B68C 5/00
(52) U.S. Cl. ........................................ 119/850; 54/79.1
(58) Field of Search ......................... 119/850; 54/79.1, 54/80.4; D30/145

(56) References Cited

U.S. PATENT DOCUMENTS

| | | | |
|---|---|---|---|
| 301,211 A | * 7/1884 | Canan | D30/145 |
| 1,218,829 A | * 3/1917 | Bean | 54/80.4 |
| 1,489,301 A | * 4/1924 | Baker | 54/79.1 |
| 2,400,781 A | * 5/1946 | Priour | 54/79.1 |
| 2,408,575 A | * 10/1946 | Norvig | 119/850 |
| D250,138 S | * 10/1978 | Bartolac et al. | D30/145 |
| 4,141,173 A | 2/1979 | Weimert et al. | |
| 4,214,421 A | 7/1980 | Battle et al. | |
| D265,516 S | 7/1982 | Wacker | |
| 4,579,085 A | 4/1986 | Mcquire | |
| 4,671,049 A | 6/1987 | Benckhuijsen | |
| 5,104,659 A | 4/1992 | Fishbein et al. | |
| 5,125,220 A | 6/1992 | Martin | |
| 5,419,076 A | 5/1995 | Moreland et al. | |
| 5,426,925 A | 6/1995 | Smargiassi | |
| 5,456,215 A | * 10/1995 | Deutscher et al. | 119/850 |
| D383,258 S | 9/1997 | Curtis | |
| 5,839,395 A | 11/1998 | Kelley | |
| 5,984,855 A | 11/1999 | DiNapoli | |
| 6,003,290 A | 12/1999 | Hsi-Chang | |
| D419,270 S | 1/2000 | Ruscitti | |
| 6,009,693 A | 1/2000 | Hsi-Chang | |
| D423,737 S | 4/2000 | MacGuinness | |

\* cited by examiner

Primary Examiner—Charles T. Jordan
Assistant Examiner—Elizabeth Shaw

(57) ABSTRACT

A fly protector for cattle that includes a rectangular sheet of fabric, an anterior attachment means, a posterior attachment means, a plurality of fastening means , and a sealing means. The fly protector can further include leg coverings. The fly protector can be made of a cloth, an elastic, or a polymer material and the material may be porous.

18 Claims, 5 Drawing Sheets

FLY PROTECTOR

BACKGROUND

The cattle industry suffers commercial losses do to ectoparasites. These losses have been well documented in the past, for example S. E. Kunz, Livestock Pests, USDA-Agricultural Research Service, Texas, in: Encyclopedia of Agricultural Science, Volume 2, 1994 put the loss due to the following pests as follows: (a) Horn Fly—$876 million, (b) Stable fly—$432 million, (c) Horse fly—$190 million, (d) Mosquitos—$50 million, and (e) cattle grub—$560 million.

The horn fly is viewed as the most economically damaging pest and causes up to 14 percent weight loss in range cattle. When fly control is practiced, the calves of cows experiencing fly control can have weights up to 6 kilos higher than calves that are infested with horn flies. Steers and heifers also are affected by the horn flies when fly control is not practiced.

The stable fly is another parasite that hampers the cattle industry. Stable flies reduce the average daily gains of beef cattle by about 0.25 kilos per calf in a feed lot situation. The milk production of dairy cattle is also reduced due to the stable fly.

The horse fly and mosquitos are insect vectors of anaplasmosis, which can result in considerable weight loss and death if the animal bitten is left untreated.

The cattle industry has addressed these commercial losses generally using pesticides. The problem with using pesticides is that they do not eliminate all the insects treated, in turn this leads to a more resistant strain of the pest treated. This problem has been documented in S. E. Kunz and K. H. Kemp, Insecticides and Acaricides: Resistance and Environmental Impact, Rev. Sci. Tech. Off. Int. Epiz., 1994, 13(4), pages 1249–1286.

Genetic selection is the underlying process for pesticide resistance. It is documented, in most cases that insects survive pesticide treatment due to genetic differences as opposed to the lack of full exposure to the pesticide. The selective pressure being imposed on pests by insecticides leads to a surviving pest that will breed stronger strains that will be equally resistant to the insecticide being utilized. The following pests have been shown to be resistant to pesticides in the United States: horn flies, buffalo flies, and sheep blowflies. Common problems that pesticide users face include: (1) users see pest survivors after treating the animal with a pesticide, (2) they misunderstand why all of the pests were not terminated, (3) so they increase the dosage of the pesticide used when treating the animals. This increase in pesticide only works to make future generations of the pest more resistant to insecticides. The industry deals with the problem by changing the insecticides being used to treat the animals. The problem with this approach is that the animals adapt to the new insecticides and the cycle is repeated. The current trend is that resistance to insecticides is increasing with these pests and the industry's efforts to produce new pesticide compounds is slowing down. The problem with using pesticides to combat the problem is that the pesticides are toxic to many animals and are harmfull to the environment.

Information relevant to attempts to address theses problems can be found in U.S. Pat. Nos. 5,419,076, 5,104,659, 4,579,085, and 4,141,173. However, each one of these references suffers from one or more of the following disadvantages: pesticide resistance and re-infestation once the animal has been treated.

Accordingly, there is a pressing need in the industry to develop a device or a method to minimize the effects of pests on the cattle industry while at the same time preserving our environment from pesticides.

SUMMARY

The present invention is directed to a fly protector for cattle that satisfies the need of reducing the amount of pesticide released into our environment while at the same time protecting cattle from pests that feed upon them. A fly protector for cattle having features of the present invention comprises a rectangular sheet of fabric, wherein a first and a second side of the rectangular sheet of fabric are parallel to each other and measure from about the withers of the cow to about the base of the tail of the cow and where the third and fourth sides of the rectangular sheet of fabric are parallel to each other and have a length that measures a distance that surrounds the dorsal and ventral portions of the cow between the withers and the base of the tail of the cow. The rectangular sheet of fabric will have an anterior means for attachment engaged adjacent to the first and third sides of the rectangular sheet of fabric, the anterior means for attachment will surround the neck of the cow and will serve to secure the fly protector on the cow. The rectangular sheet of fabric will have a posterior means for attachment engaged adjacent to the first and fourth sides of the rectangular sheet of fabric, the posterior means for attachment will surround the base of the tail of the cow and will serve to secure the fly protector on the cow. A plurality of fastening means for connecting the first and second sides of the rectangular sheet of fabric once the fabric has been placed around the dorsal and ventral portion of the cow and in which said plurality of fastenings means will be fastened on the dorsal (upper portion/the back) of the cow. Lastly, a sealing means for sealing the spaces between the plurality of fastening means between the first and second sides of the rectangular sheet of fabric so that the rectangular sheet of fabric forms an impenetrable border between the first and the second sides of the rectangular sheet of fabric. The reason for forming this impenetrable border is to prevent pests from entering the fly protector through this connection while at the same time reinforcing the connection between the first and second sides of the rectangular sheet of fabric. The fly protector ideally will be made of an elastic material that has pores that are no more than 3 millimeters in diameter. The fly protector may have a slit running parallel with the first and second sides of the rectangular sheet of fabric in which said slit is centrally located from all sides of the rectangular sheet of fabric.

In another variation of the invention, the anterior means for attachment will be tubular sheet of fabric that will fit over the cow's head and rest between the neck of the cow and the withers of the cow. The tubular sheet of fabric will be attached to the fly protector's anterior portion using a plurality of fastening means and may also employ a sealing means to seal the connection between the anterior portion of the fly protector and the tubular sheet of fabric. The tubular sheet of fabric will guard the cow's neck portion from being bitten.

Another variation of the invention may employ leg protectors in which the leg protectors are conical sheets of fabric that cover from the dew claw of the cow to about the point of elbow of the cow and in which the leg protectors will be connected by an elastic means that will rest on the dorsal part of the cow so that the front leg protectors are connected together and the rear leg protectors are connected together. The purpose of the leg protectors is to protect milking cows from pests that customarily feed upon them.

The purpose for the elastic means is to insure that the leg protectors will not slide down the leg of the cow and thereby defeat the purpose of the leg protectors.

In the above variations of the invention, the sheets of fabric can be porous. The pores can range up to 3 millimeters in diameter, the pores of the sheets of fabric can be determined based on the pest that the cow is being guarded against.

DRAWINGS

These and other features, aspects, and advantages of the present invention will become better understood with regard to the following description, appended claims, and accompanying drawings where:

DESCRIPTION

In order to be better understood, a description of the invention is herewith offered, based on a practical application of the above mentioned drawings.

Figure 1:
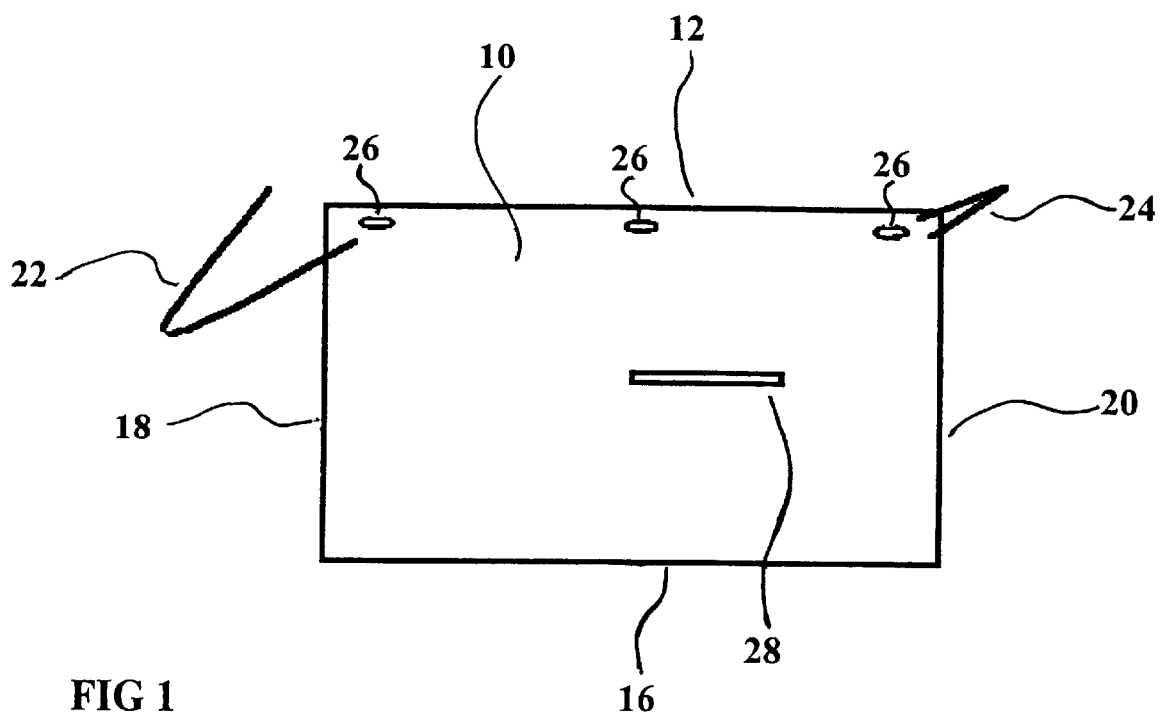
FIG. 1 shows a top view of the outside of a fly protector for cattle.

As shown in FIG. 1, a fly protector for cattle comprises a rectangular sheet of fabric 10 wherein said rectangular sheet of fabric's first 12 and second sides 16 are parallel to each other and said rectangular sheet of fabric's third 18 and fourth sides 20 are parallel to each other, an anterior means for attachment 22 engaged adjacent to the first 12 and third sides 18 of the rectangular sheet of fabric 10, a posterior means for attachment 24 engaged adjacent to the first 12 and fourth 20 sides of the rectangular sheet of fabric, a plurality of fastening means 26 for connecting the first 12 and second sides 16 of the rectangular sheet of fabric after the rectangular sheet of fabric 10 has been draped around the cow being protected wherein said connection is made and aligned alongside the upper most part of the cow, and lastly a sealing means is applied between the fastening means so that the first 12 and second 16 sides of the rectangular sheet of fabric is sealed between the plurality of fastening means 26. The rectangular sheet of fabric can be made of a cloth, elastic, or polymer material, the material can be porous. If the material is porous, the pores cannot be larger than 3 millimeters. The rectangular sheet of fabric's first 12 and second sides 16 will measure from about the withers of a cow to about the base of the tail of the cow, the rectangular sheet of fabric's third 18 and fourth 20 sides will measure a distance that surrounds the dorsal and ventral portions of the cow. The anterior means of attachment 22 is preferably an elastic band that is sewn on the rectangular sheet of fabric 10, other means of engagement may be used and are known in the art. The anterior means for attachment 22 may also be made of a cloth material that is not elastic. In either variation of the anterior means for attachment 22, the anterior means for attachment 22 would be placed around the neck of the cow and then tied to its engaged side, this would prevent the rectangular sheet of fabric from sliding down the back of the cow. The posterior means of attachment 24 is preferably an elastic band that is sewn on the rectangular sheet of fabric 10, other means of engagement may be used and are known in the art. The posterior means 24 may also be made of a cloth material that is not elastic. In either variation of the posterior means for attachment 24, the posterior means of attachment 24 would be placed around the base of the tail of the cow and then tied to its engaged side, this would prevent the rectangular sheet of fabric 10 from sliding up the back of the cow. The plurality of fastening means 26 can be clips, buttons, pressure buttons or any other means known in the art to secure two pieces of material together. After draping the rectangular sheet of fabric around the cow, the plurality of fastening means 26 would be placed on the first 12 and second 16 sides of the rectangular sheet of fabric to form a tube around the cow. The connection of the first and second sides of the rectangular sheet of fabric will be made and run alongside the upper most part of the cow. And lastly, a sealing means for sealing the spaces between the plurality of fastening means 26 will be applied to the rectangular sheet of fabric 10. The sealing means can be any glue known in the art to seal the rectangular sheet of fabric 10. The sealing means can also be made of synthetic materials that adhere when pressed together, commonly sold under the trademark "Velcro." The fly protector may have a slit 28 running parallel with the first 12 and second 16 sides of the rectangular sheet of fabric and said slit 28 being centrally located from all sides of the rectangular sheet of fabric 10.

Figure 3:
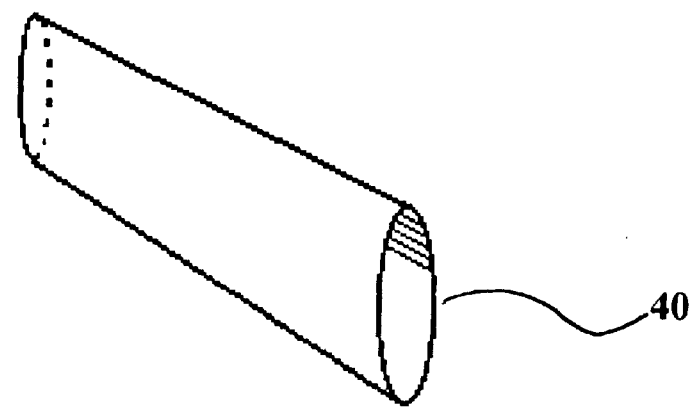
FIG. 3 shows a perspective of an anterior means for attachment that forms another embodiment of the present invention in which said anterior means of attachment would substitute the anterior means for attachment of FIG. 1.
Figure 4:
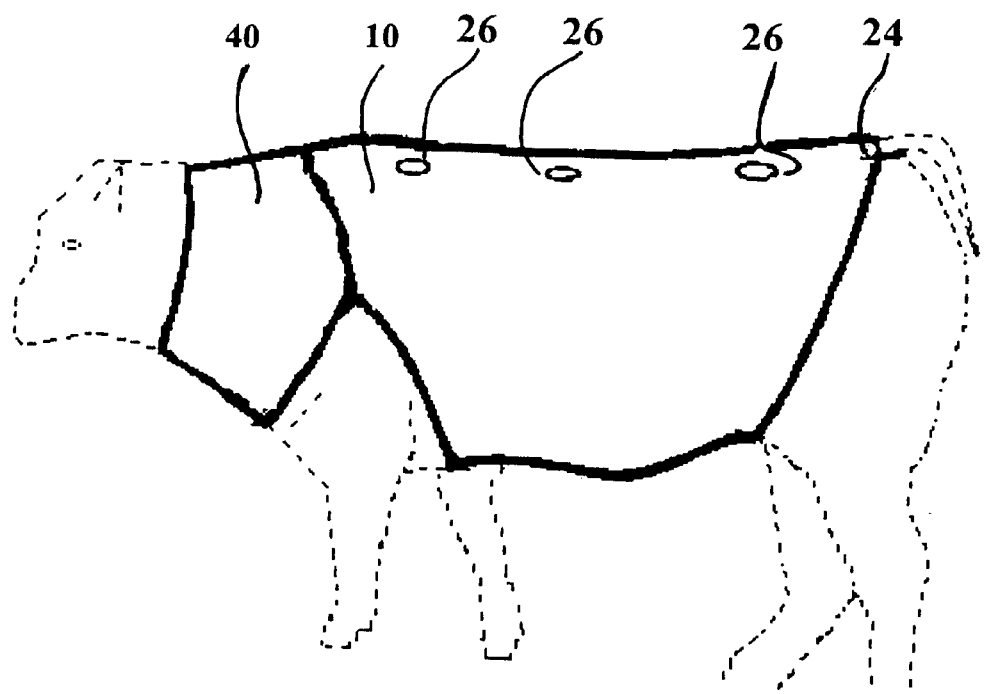
FIG. 4 shows an alternative embodiment of the presently claimed invention.
Figure 5:
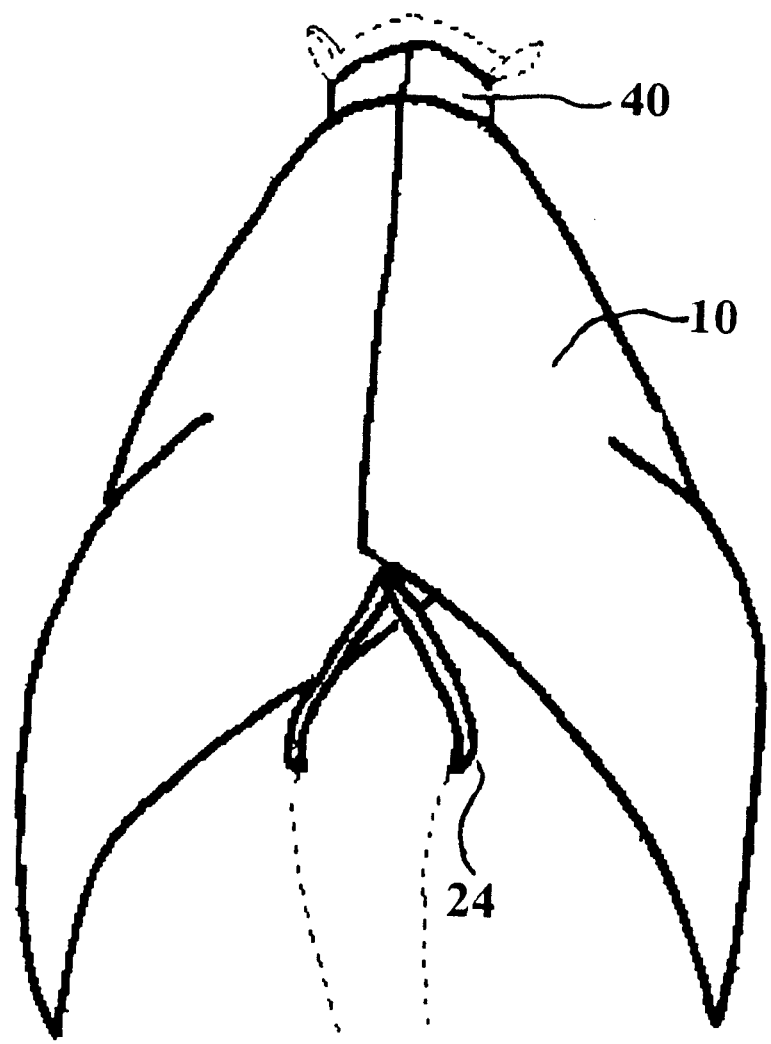
FIG. 5 shows a perspective top side view of the fly protector for cattle on a cow.

In another embodiment of the invention as shown in FIG. 3, the anterior means for attachment 40 can be a tubular sheet of fabric made of a cloth, elastic or polymer material. The tubular sheet of fabric 40 would have a length that would measure from about the top of the neck of the cow to about the withers of the cow. The tubular sheet of fabric 40 would be connected to the rectangular sheet of fabric 10 using the same means described above to connect the first 12 and second 16 sides of the rectangular sheet of fabric 10 together. FIG. 4 shows this embodiment of the invention on the cow.

Figure 2:
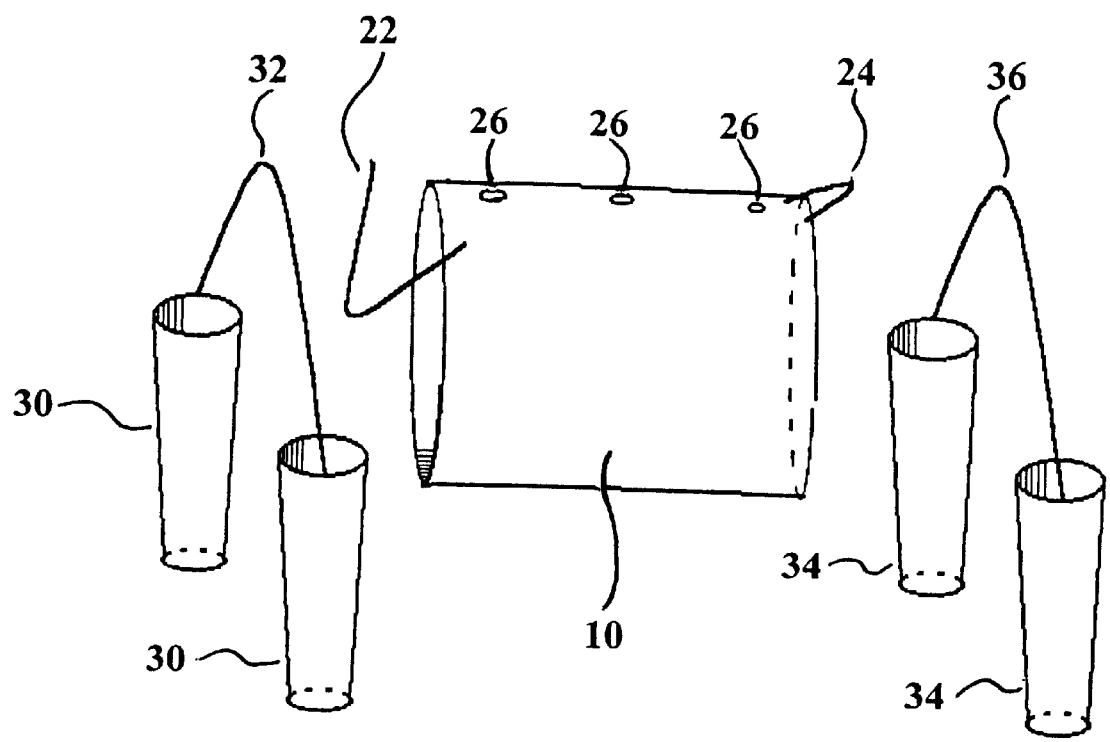
FIG. 2 shows a perspective side view of the fly protector for cattle and a perspective side view of a pair of leg accessories that form a further embodiment of the present invention.
Figure 6:
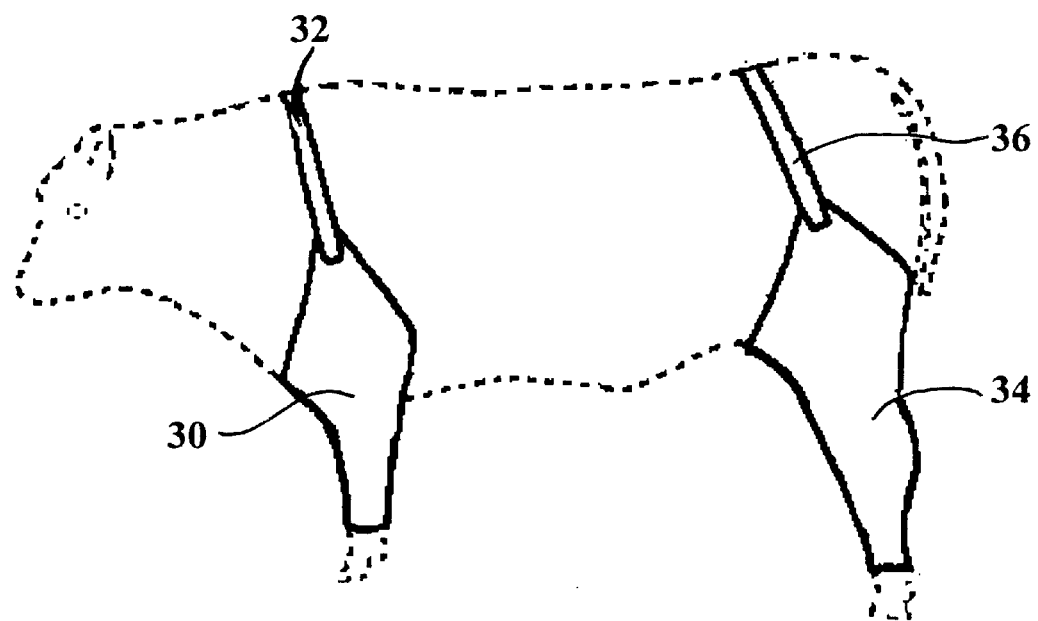
FIG. 6 shows a perspective view of the front and rear leg coverings of the fly protector on the cow.

In another embodiment of the invention as shown in FIG. 2, the fly protector would further comprise of front and rear leg coverings. The leg coverings can be made of cloth, elastic or polymer materials. The front leg coverings will comprise of a first pair of conical sheets of fabric 30 that are connected to each other by a first elastic attachment means 32. The first conical sheets of fabric 30 will have a length that covers from about the dewclaw of each front leg of the cow to about the point of elbow of each front leg of the cow and in which the upper portion of each first pair of conical sheets of fabric has a greater diameter than the lower portion. The first elastic attachment means 32 will be an elastic band that is connected to each of the first pair of conical sheets fabric at their upper portion by known means in the art. The rear leg coverings will comprise of a second pair of conical sheets of fabric 34 that are connected to each other by a second elastic attachment means 36. The second conical sheets of fabric 34 will have a length that covers from about the dewclaw of each rear leg of the cow to about the point of elbow of each rear leg of the cow and in which the upper portion of each second pair of conical sheets of fabric has a greater diameter than the lower portion. The second elastic attachment means 36 will be an elastic band that is connected to each of the second pair of conical sheets of fabric at their upper portion by known means in the art. The first 32 and second 36 elastic attachment means would rest on the dorsal part of the cow after the front and rear leg coverings are placed on the cow. The placement of the front and rear leg coverings on the cow are shown in FIG. 6. The front and rear leg coverings can further comprise of a third elastic attachment means that has a first and second end in which the first end of the third elastic attachment means is connected to the midpoint of the first elastic attachment means 32, and in which the second end of the third attachment means is connected to the midpoint of the second attachment means 36. The third elastic attachment means is made of an elastic band and would serve the purpose of keeping the first 32 and second 36 elastic attachment means on the cow.

This invention is used by placing the fly protector on the animal. To place the fly A protector on the cow, one would place the cow within a holding structure and slide the rectangular sheet of fabric underneath the cow, then the first and second sides of the rectangular sheet of fabric would be connected together, then the front and rear attachment means would be secured on the cow. If using the full fly protector, one would place the leg coverings over the cow's legs and the fly protector would be fully assembled.

The fly protector would be used in areas that have temperatures that are conducive to pest infestation. The fly protector would also be used on milking cows, for milking cows tend to be prone to pests that feed on their lower extremities.

The previously described versions of the present invention have many advantages, including minimizing the amounts of pesticides released into our atmosphere, preserving the health of the cows, maximizing the weight gain of the cows, slowing down the resistance of pests to current pesticides, and having a fly protector that does not restrict the movement of the cow.

Various changes in the details, steps and components that have been described may be made by those skilled in the art within the principles and scope of the invention herein illustrated. Therefore, while the present invention has been shown and described herein in what is believed to be the most practical and preferred embodiments, it is recognized that departures can be made therefrom within the scope of the invention, which is not to be limited to the details disclosed herein but is accorded the full scope embraced by any and all equivalent processes and products.

The invention claimed is:

1. A fly protector for cattle which comprises:
   a rectangular sheet of fabric, wherein a first and a second side of the rectangular sheet of fabric are parallel to each other and have a width that measures from about the withers of the cow to about the base of the tail of the cow and a third and a fourth side of the rectangular sheet of fabric are parallel to each other and have a length that measures a distance that surrounds the dorsal and ventral portions of the cow between the withers and the base of the tail of the cow;
   an anterior means for attachment engaged adjacent to the first and third sides of the rectangular sheet of fabric in which the anterior means of attachment will surround the neck of the cow;
   a posterior means for attachment engaged adjacent to the first and fourth sides of the rectangular sheet of fabric in which the posterior means of attachment will surround the base of the tail of the cow;
   a plurality of fastening means for connecting the first and second sides of the rectangular sheet of fabric after placing the rectangular sheet of fabric over the cow and in which the connection will be made at the upper most part of the cow and will be aligned alongside the upper most part of the cow; and
   a sealing means for sealing the first and second sides of the rectangular sheet of fabric after the first and the second sides of the rectangular sheet of fabric are connected.

2. The fly protector of claim 1, wherein the fly protector has a slit running parallel with the first and second sides of the rectangular sheet of fabric and said slit being centrally located from all sides of the rectangular sheet of fabric.

3. The fly protector of claim 1, wherein the sheet of fabric is made of an elastic material that is permeable and in which the pores of said elastic material do not exceed one millimeter.

4. The fly protector of claim 1, wherein the anterior means for attachment is a tubular sheet of fabric that surrounds the neck of the cow and has a length that measures from about the top of the neck of the cow to about the withers of the cow.

5. The fly protector of claim 4, wherein the posterior means of attachment is an elastic band.

6. The fly protector of claim 5, which further comprises of front and rear leg coverings for the cow.

7. The fly protector of claim 6, wherein the front and rear leg coverings comprise of:
   a first pair conical sheets of fabric having an upper and a lower portion, which will be called the front leg coverings, and in which each of the conical sheets of fabric of the first pair have a length that covers from about the dewclaw of each front leg of the cow up to about the point of elbow of each front leg of the cow, and in which each conical sheet of fabric's upper portion has a greater diameter than the lower portion;
   a first elastic attachment means attached to each conical sheet of fabric of the first pair at a location that is on the upper portion of each conical sheet of fabric and in which said first elastic attachment means would rest on the dorsal part of the cow;
   a second pair of conical sheets of fabric having an upper and a lower portion, which will be called the rear leg coverings, and in which each of the conical sheets of fabric of the second pair have a length that covers from about the dewclaw of each rear leg of the cow to about the point of elbow of each rear leg of the cow, and in which each conical sheet of fabric's upper portion has a greater diameter than the lower portion; and
   a second elastic attachment means attached to each conical sheet of fabric of the second pair at a location that is on the upper portion of each conical sheet of fabric and in which said second elastic attachment means would rest on the dorsal part of the cow.

8. The fly protector of claim 7, further comprising a third elastic attachment means that consists of a first and a second end, and in which the first end of the third elastic attachment means is connected to the midpoint of the first elastic attachment means, and in which the second end of the third attachment means is connected to the midpoint the second elastic attachment means.

9. The fly protector of claim 8, wherein the fly protector has a slit running parallel with the first and second sides of the rectangular sheet of fabric and said slit being centrally located from all sides of the rectangular sheet of fabric.

10. The fly protector of claim 9, wherein all of the sheets of fabric are made from an elastic material that is permeable and in which the pores of said elastic material do not exceed one millimeter.

11. The fly protector of claim 1, wherein the anterior means for attachment is an elastic band.

12. The fly protector of claim 11, wherein the posterior means of attachment is an elastic band.

13. The fly protector of claim 12, which further comprises of front and rear leg coverings for the cow.

14. The fly protector of claim 13, wherein the front and rear leg coverings comprise of:
- a first pair conical sheets of fabric having an upper and a lower portion, which will be called the front leg coverings, and in which each of the conical sheets of fabric of the first pair have a length that covers from about the dewclaw of each front leg of the cow up to about the point of elbow of each front leg of the cow, and in which each conical sheet of fabric's upper portion of the first pair has a greater diameter than the lower portion;
- a first elastic attachment means attached to each conical sheet of fabric of the first pair at a location that is on the upper portion of each conical sheet of fabric and in which said first elastic attachment means would rest on the dorsal part of the cow;
- a second pair of conical sheets of fabric having an upper and a lower portion, which will be called the rear leg coverings, and in which each of the conical sheets of fabric of the second pair have a length that covers from about the dewclaw of each rear leg of the cow up to about the point of elbow of each rear leg of the cow, and in which each conical sheet of fabric's upper portion of the second pair has a greater diameter than the lower portion; and
- a second elastic attachment means attached to each conical sheet of fabric of the second pair at a location that is on the upper portion of each conical sheet of fabric and in which said second elastic attachment means would rest on the dorsal part of the cow.

15. The fly protector of claim 14, further comprising a third elastic attachment means that consists of a first and a second end, and in which the first end of the third elastic attachment means is connected to the midpoint of the first elastic attachment means, and in which the second end of the third attachment means is connected to the midpoint of the second elastic attachment means.

16. The fly protector of claim 15, wherein the fly protector has a slit running parallel with the first and second sides of the rectangular sheet of fabric and said slit being centrally located from all sides of the rectangular sheet of fabric.

17. The fly protector of claim 16, wherein all of the sheets of fabric are made from an elastic material that is permeable and in which the pores of said elastic material do not exceed one millimeter.

18. The fly protector of claim 16, wherein all of the sheets of fabric are made from an elastic material that is permeable and in which the pores of said elastic material do not exceed three millimeters.

* * * * *